Figure 1:
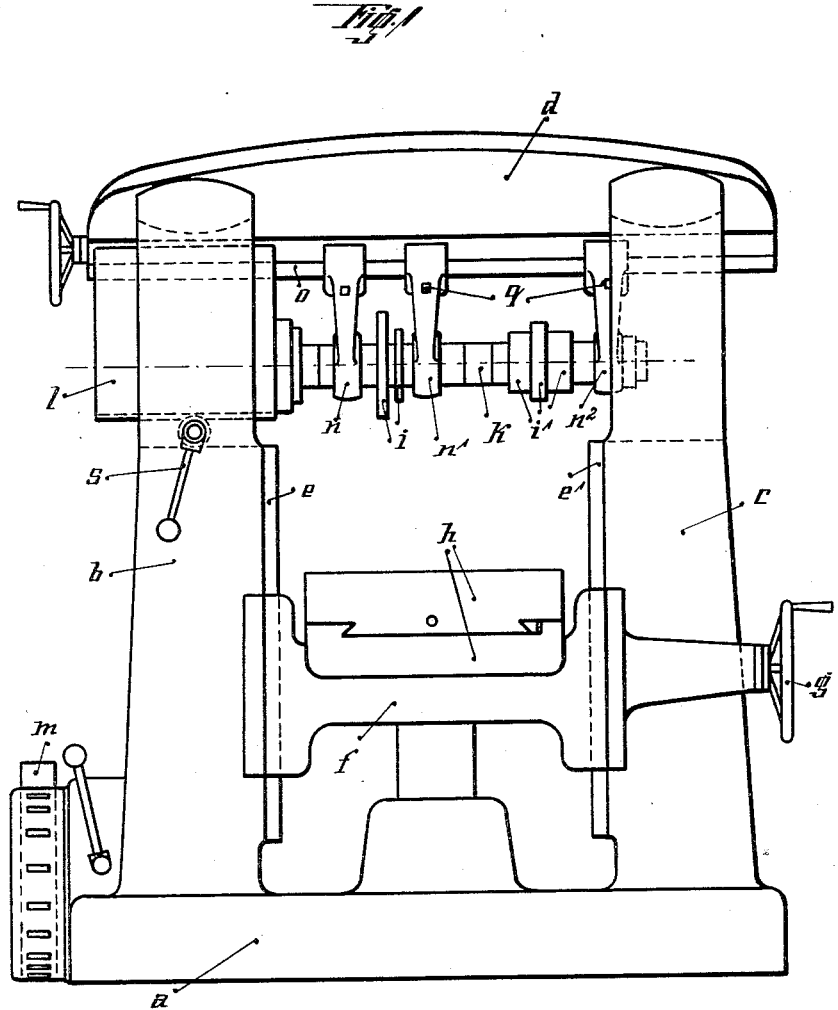

Oct. 31, 1933. L. KELLENBERGER 1,932,824
MILLING MACHINE WITH RIGID FRAME
Filed July 16, 1928 4 Sheets-Sheet 1

Inventor:
L. Kellenberger
by:
Hans Hedrich
Attorney

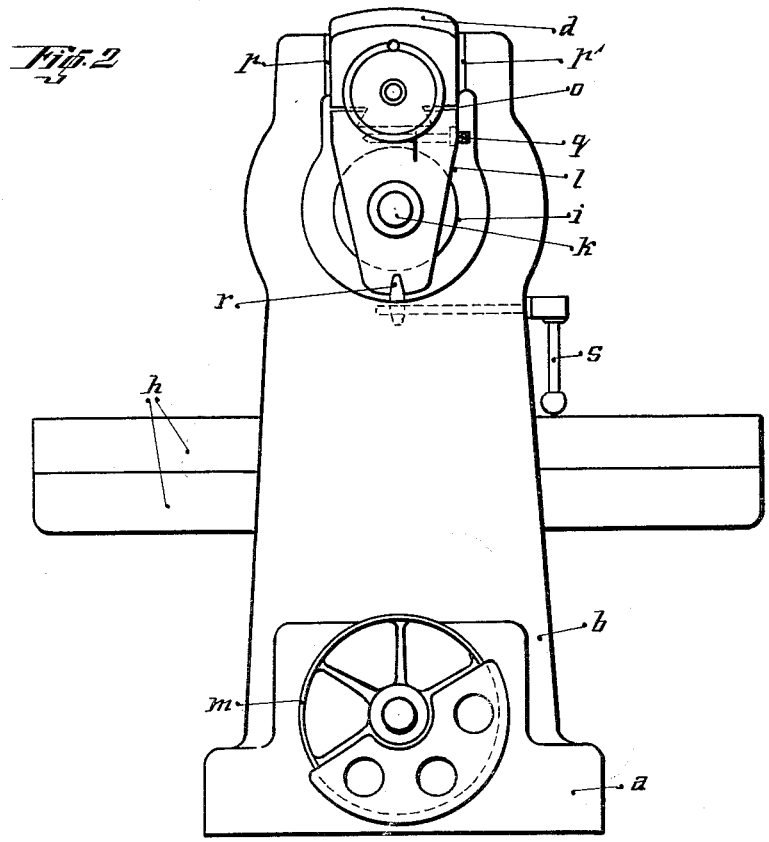
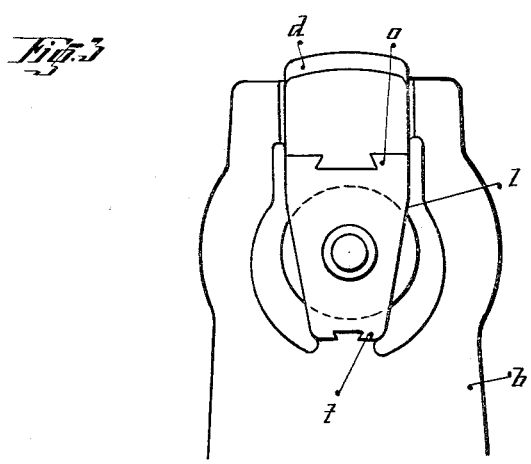

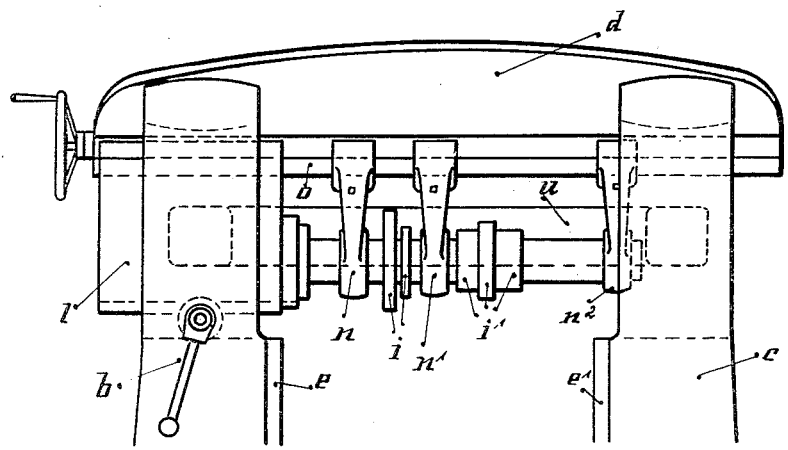
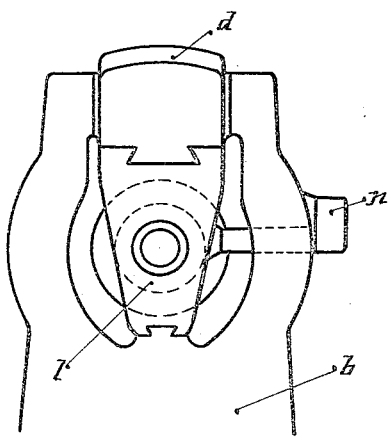

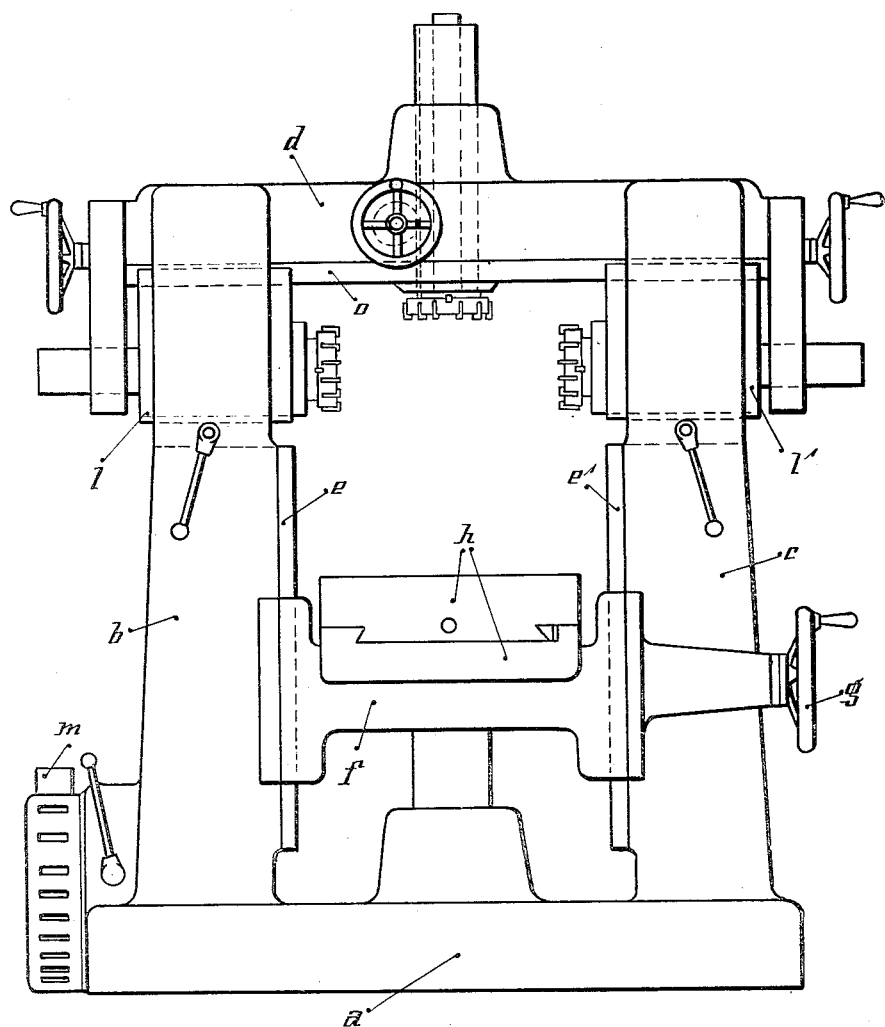

Patented Oct. 31, 1933

1,932,824

UNITED STATES PATENT OFFICE 1,932,824

MILLING MACHINE WITH RIGID FRAME

Leonhard Kellenberger, St. Gallen, Switzerland

Application July 16, 1928, Serial No. 293,218, and in Germany August 9, 1927

5 Claims. (Cl. 90—18)

This invention relates to a high-efficiency milling machine with rigid frame. In modern machine-building the milling machines are subjected to very great strain in order to increase the performance of the same. The more rigid a milling machine is, the bigger is its performance and the greater is the accuracy of the same or, in other words its economical effect.

Instead of the knee or bracket-table milling machine, in which the milling mandrel is supported either in such a manner as to overhang, or is supported in a twofold manner by removable counter-stays, there are now used rigid-frame milling machines in which the milling mandrel is supported at both ends in mandrel carriers in the vertical standard of the milling machine. Owing to the provision of supporting members arranged within said standards, that is to say, between the mandrel carriers it has even been rendered possible to support the milling mandrels in a still better manner.

The known milling machines of the type in question suffer from the drawback that the rigid connection between the members of the frame must be disconnected in order to make it possible to move the mandrel carriers, the supporting standards and the mandrels to their respective places and to affix them there. A frame is, however, permanently rigid only if it does not consist of disconnectable parts or members.

There are also known milling machines in which the frame is and remains continually rigid, and for the purpose of attaching the above-mentioned parts to it the axis of the transverse beam is arranged in staggered position relatively to the plane of the axis of the frame standard. The working pressure is transmitted to the standards not as an axially acting force, but produces a torsional momentum in the transverse beam and a momentum of flexure in the standards, that is to say, it produces uncontrollable distortions and displacements in the entire frame system whereby the rigidity thereof is diminished or impaired.

Furthermore, milling machines are known in which the counter bearing is mounted in an opening in the standard of the rigid frame. As to these machines no supporting standards can be attached, only short milling mandrels can be used because long ones would bend. The working range of these machines is, therefore, limited.

The present invention obviates all said drawbacks and disadvantages, in that all parts of the entire frame, i. e. the foot plate, the standard, and the transverse beam, are and remain continually united with one another. Loosening of any one of these parts, as well as distortions as a consequence of the disconnection of a connection, cannot arise. The axle of the transverse beam which is designed as a guide member for the mandrel carriers and the supporting standards lies in the plane of the axis of the standards. The mandrel carriers are rigidly connected with the standards by means of a clamping device located above the standards so that the lateral working pressures must be transmitted to the transverse beam, and taken up, not by the intermediary of the guide provided at this beam, but they are transmitted at least partly to the standard. Besides, the mandrel carriers are guided on two sides in the supports which affords another security against distortion. In order to compensate the horizontal working pressures the supporting standards are stayed horizontally directly over the milling tool by a second transverse beam so that practically no detrimental momenta of flexure in the frame system can arise.

Through openings provided in the standards the milling mandrel carriers, as many supporting standards as desired, and the mandrels themselves, can be brought to their respective places, and the supporting standards can be stayed as often times as desired because they are not subjected to detrimental bendings. The distance between the standards can therefore, be chosen, as great as practically admissible because the milling mandrels can be stayed vertically by means of suspended arms as often times as desired.

The transverse beam can now be arranged in the greatest height practically admissible, as the supporting standards and with them the milling mandrels are stayed horizontally directly above the milling tool by the above-mentioned second transverse beam. The invention permits, thus, the practically largest extended working range without any diminution of the rigidity, the accuracy, and the economy of the machine.

The improved milling machine is illustrated diagrammatically and by way of example on the accompanying drawings, on which Figure 1 is a front-view of an upright milling machine designed according to this invention; Figure 2 is a side-view of the machine; Figure 3 shows a modification of the uppermost part of Fig. 2; Figure 4 is a modification of the upper part of Fig. 1; Figure 5 is a side-view resembling Fig. 3, but relating to the modification shown in Fig. 4; and Figure 6 is a complete front-view of again another constructional form, all as fully described hereinafter.

The vertical frame of the milling machine shown in Fig. 1 consists of the foundation plate $a$, the two standards $b$ and $c$, and the transverse beam or horizontal top beam $d$. These members may be manufactured singly and then rigidly connected with each other, or may be made integral. The inner faces of the standards are designed as prismatic guides $e$ and $e^1$, and between them is the table carrier $f$ adjustable in vertical direction. This is effected by means of the lateral hand-wheel $g$ and known transmission means. The work carrier is provided in known manner with the work-piece receiving tables $h$ which can be movable rectilinearly at right angles with respect to one another, or of which one, or both, may be rotary, as required. The milling tools $i$ and $i^1$ are affixed, as usually, to the milling mandrel $k$ which is supported at one end in the suspended member $l$ located at the top of the standard $b$, as well as held and stayed by three arms $n$, $n^1$, $n^2$ extending downwardly from prismatic guide ledges $o$ provided at the bottom face of the beam $d$. Each of said arms can be horizontally shifted and adjusted at said ledges $o$. Also the member $l$ can be shifted and adjusted at the same time. The upper parts of the standards are forked, as appears from Fig. 2, and the member $l$ extends from the ledges $o$ downwardly between the legs or horns of the fork formed by the upper part of the standard $b$.

$m$ denotes a pulley for transmitting power to the machine. The inner transmission members are not shown in the drawings, because they do not form parts of the invention.

It appears from Fig. 2 that the suspended member $l$ extends freely downwardly between the legs or horns of the forked standard $b$ and can be moved through between said legs or horns on either side or end of the machine. The prismatic guide ledges of the transverse beam $d$ are designed as dovetailed feathers and grooves, and the arms $n$, $n^1$, $n^2$ can be secured in their adjusted position by screws $q$.

The member or milling slide $l$ is supported on that side which lies counter to the prismatic guide $c$ by a clamping $r$ which can be actuated by a lever or arm $s$ or an equivalent member. The device $r$ is so designed that the milling slide or member $l$ can be clamped fast in vertical direction, as well as laterally. Said device $r$ comprises also an eccentric disk (not visible in the drawings) which is guided in a groove of the milling slide. When the lever or arm $g$ is tightened, said eccentric disk which is of conical shape is pressed upwardly whereby the milling slide is clamped fast horizontally, as well as vertically.

In the modification shown in Fig. 3 the member $l$ is guided at its upper end in the same manner as in Fig. 2, viz, by prismatic or dove-tailed ledges $o$; and similar guide ledges $t$ are provided also at its lower end so that means like $r$ and $s$ of Fig. 2 can be dispensed with, as the member $l$ is held perfectly fast in its position by the united actions of the upper and lower guides.

In the constructional form illustrated in Figs. 4 and 5 the standards $b$ and $c$ are connected by two transverse beams, viz, by the top or main beam $d$ which is the same as that in Figs. 1–3, and by an auxiliary beam $u$ which can be united or rigidly connected with the standards or may be detachable, perhaps turnable, just as best suited in the respective case.

Fig. 6 shows a milling machine provided, besides with the horizontally movable member or milling tool carrier $l$, with another such member or carrier $l'$ located opposite the carrier $l$ between the horns of the standard $c$, and a third tool carrier is arranged on and in the main beam $d$ so that there are in this case three milling tools available. For the rest, similar reference letters denote similar parts as in Figs. 1 and 2.

I claim:

1. A milling machine, comprising, in combination, a foundation plate, spaced vertical standards extending upwardly from said plate, and a transverse beam connecting said standards at their tops, these latter being forked so as each to form two horns, said transverse beam being located between said horns at the upper end of the same, said foundation plate, said standards, and said beam being permanently and rigidly connected with each other, and the axes of all of these parts lying in the same plane; and a milling tool shaft-carrier suspended from the said beam and adapted to be shifted along it through the spaces between said horns, substantially and for the purpose as set forth.

2. A milling machine, comprising, in combination, a foundation plate, spaced vertical standards extending upwardly from said plate, and a transverse beam connecting said standards at their tops, these latter being forked so as each to form two horns, said transverse beam being located between said horns at the upper ends of the same, said foundation plate, said standards, and said beam being permanently and rigidly connected with each other, and the axes of all of these parts lying in the same plane; a main milling tool shaft carrier suspended from the said beam and adapted to be shifted along it through the spaces between said horns, auxiliary milling tool shaft carriers also suspended from the said beam and adapted to be shifted along it through said horn spaces; a milling tool supporting shaft carried by said shaft carriers; and means for affixing said main carrier in its adjusted position, substantially and for the purposes as set forth.

3. A milling machine, comprising, in combination, a foundation plate, spaced vertical standards extending upwardly from said plate, and a transverse beam connecting said standards at their tops, these latter being forked so as each to form two horns, said transverse beam being located between said horns at the upper ends of the same, said foundation plate, said standards, and said beam being permanently and rigidly connected with each other, and the axes of all of these parts lying in the same plane; a main milling tool shaft carrier suspended from the said beam and adapted to be shifted along it through the spaces between said horns, auxiliary milling tool shaft carriers also suspended from the said beam and adapted to be shifted along it through said horn spaces; a milling tool supporting shaft carried by said shaft carriers, and means for guiding said main carrier also at its lower end, substantially and for the purpose as set forth.

4. A milling machine, comprising, in combination, spaced vertical standards, a main transverse beam connecting said standards at their tops, these latter being forked so as each to form two horns, said standards and said beam being permanently and rigidly connected with each other, and the axes of these parts lying in the same plane; an auxiliary transverse beam connecting a horn of the one standard with a horn of the other standard; and a main milling tool shaft carrier suspended from said main beam and adapted to be shifted along it and along said auxiliary beam, as set forth.

5. A milling machine, comprising in combination with a foundation plate, spaced vertical standards, extending upwardly from said plate, a main transverse beam connecting said standards at their tops, these latter being forked so as each to form two horns, said foundation plate, said standards and said beam being permanently and rigidly connected with one another and the axes of these parts lying in the same plane; an auxiliary transverse beam connecting a horn of the one standard with a horn of the other standards; and a main milling tool shaft carrier suspended from said main beam and adapted to be shifted along it and along said auxiliary beam, as set forth.

LEONHARD KELLENBERGER.